United States Patent Office 2,854,993
Patented Oct. 7, 1958

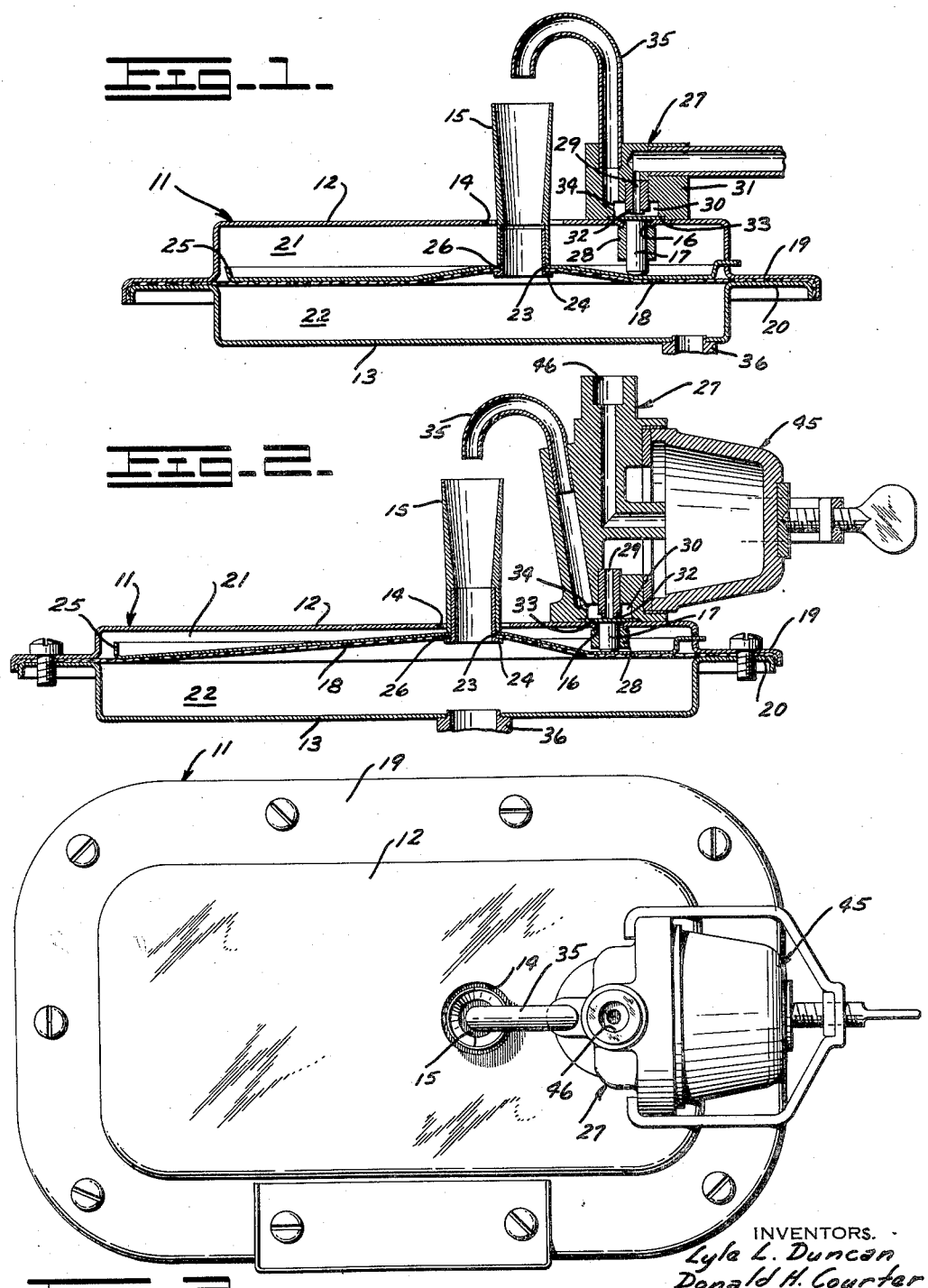

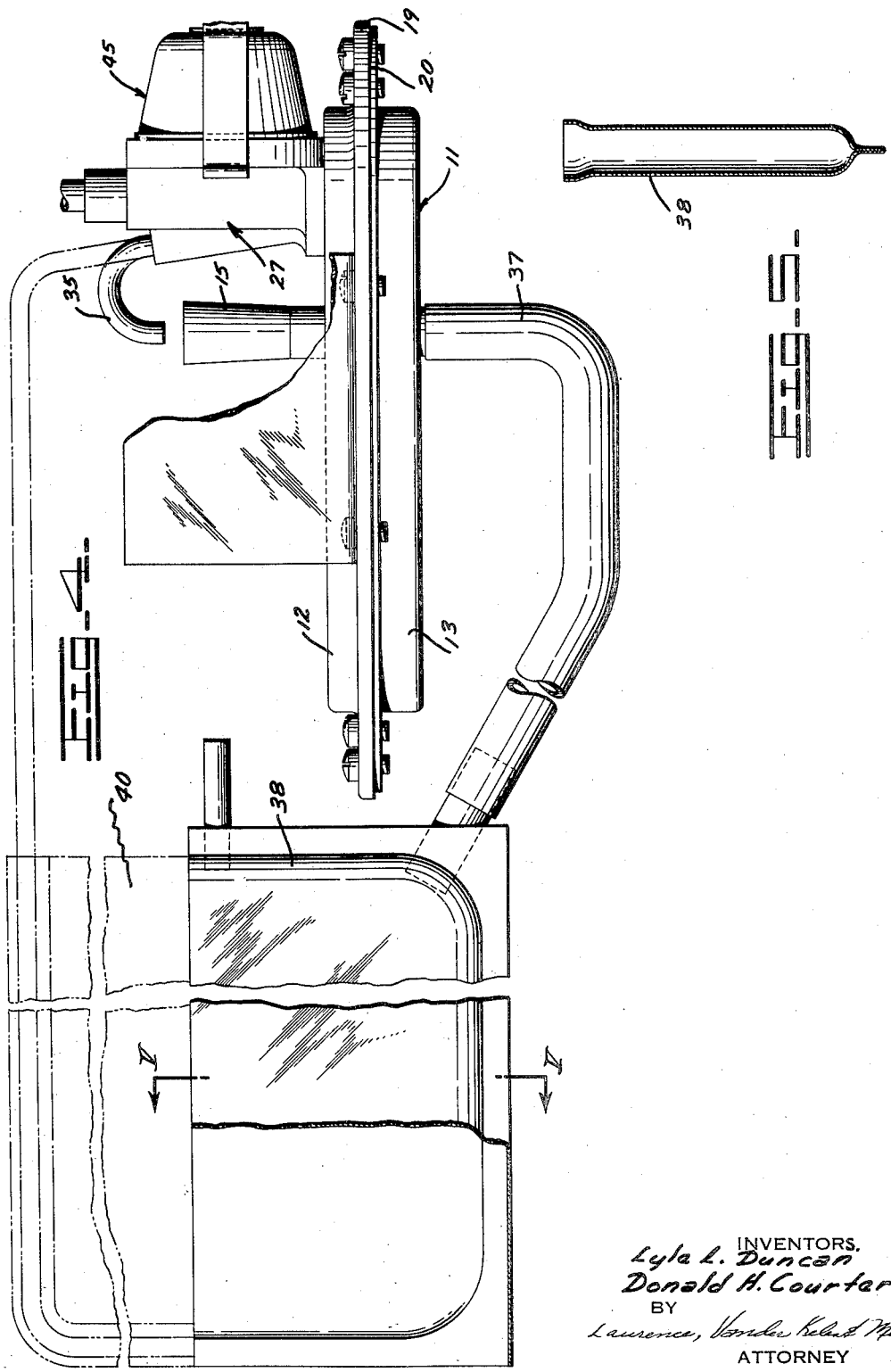

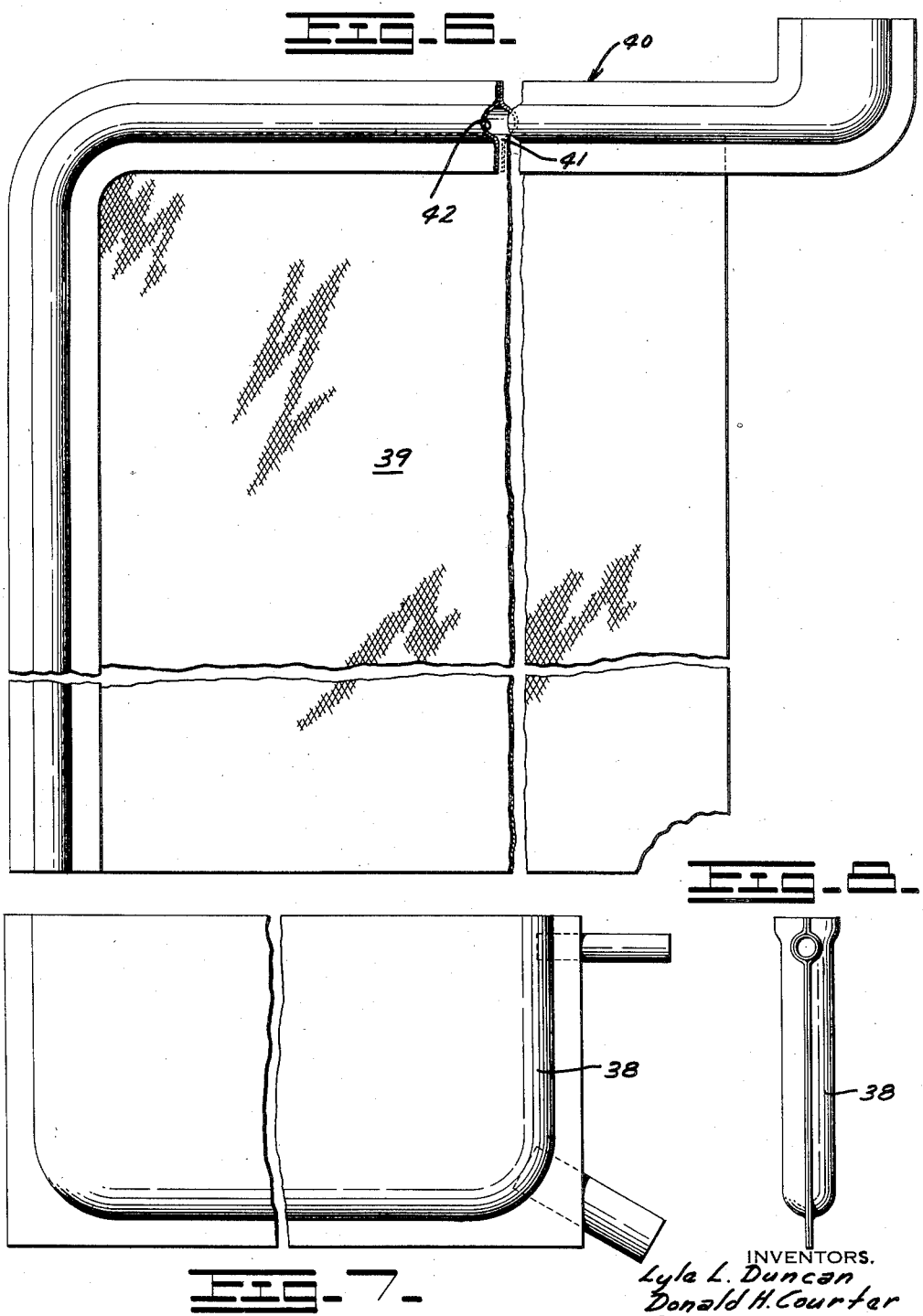

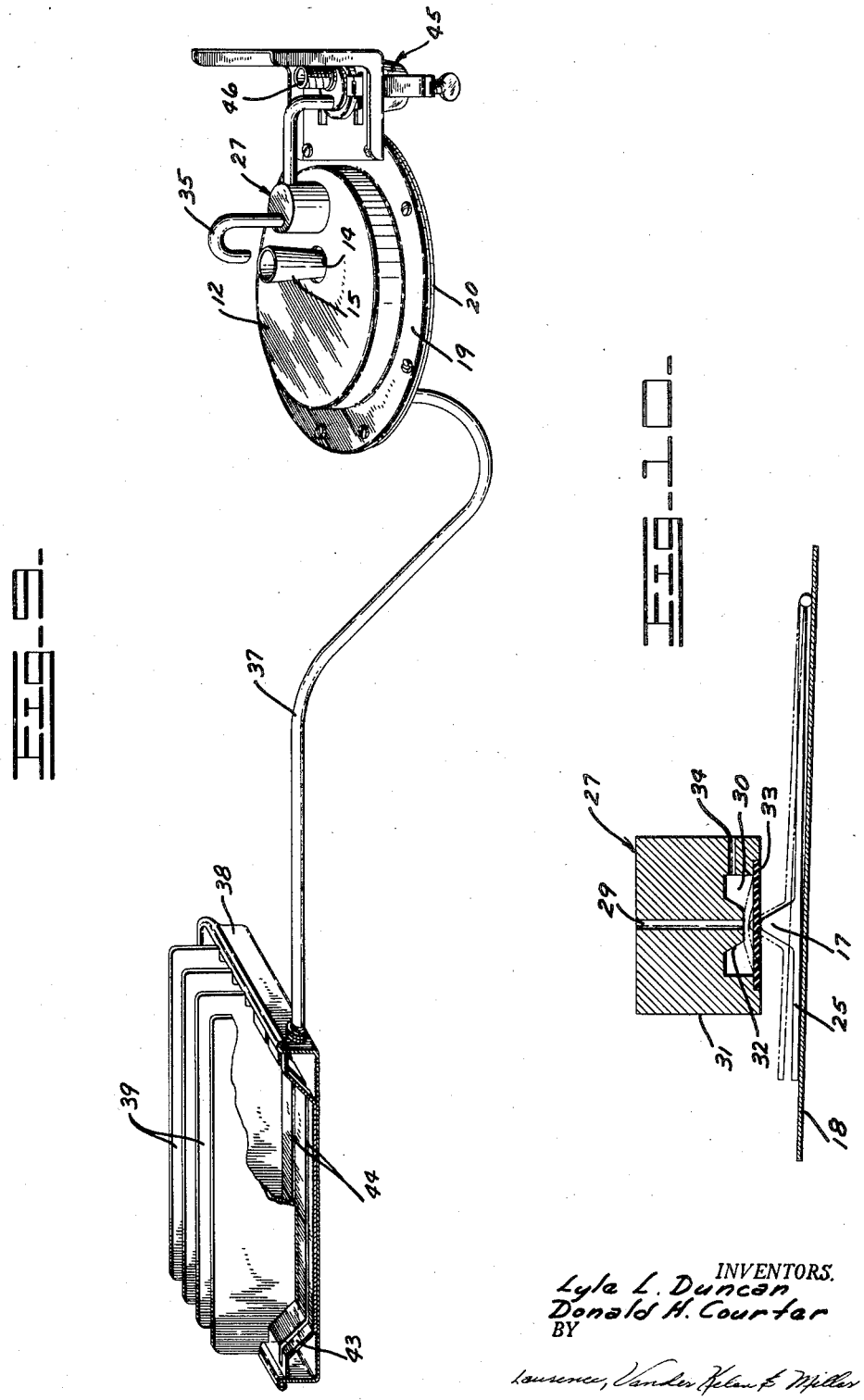

2,854,993

DIFFERENTIAL PRESSURE LIQUID LEVEL AND MOISTURE CONTROL DEVICE

Lyle L. Duncan, Boyne City, and Donald H. Courter, Petoskey, Mich.

Application August 30, 1955, Serial No. 531,526

6 Claims. (Cl. 137—406)

The present invention relates to liquid-level control devices and more particularly the invention concerns a constant level liquid control device located apart or remote from a vessel or tank in association with novel moisture control elements. The level of liquid which the device controls is maintained constant within the vessel or tank as the liquid is withdrawn, evaporated or otherwise depleted. The device accomplishing this control operates on a differential pressure sufficiently responsive to pressure variations as to accomplish smooth full flow to incremental replenishment in the remote tank.

It has been common practice to provide vessels, containers, or tanks which require constant liquid level or replenishment of a liquid with substantially automatic liquid-level control means. In the past the automatic means have been generally of the float-operated valve type since they were easily manufactured and their adaptations well known in application in the valve art. More modern controls have utilized the electrode-sensitive operated valves which regulate automatically the flow of fluid or liquid to or from a tank or reservoir in response to the flow or non-flow of an electric current between the electrodes immersed in the liquid. When such electrodes are immersed in the fluid, current will flow completing an electric circuit. The electric circuit will cause a valve to close stopping the introduction of liquid to the tank. When such tank or reservoir is depleted of liquid by evaporation or withdrawal below a level where an electrical contact through the fluid is accomplished, no electricity will flow in the circuit, a valve will be opened and liquid will be fed to the reservoir until the electrode is immersed, at which point the electrical circuit is re-established. Both of these automatic systems have been subject to some operating difficulties. The automatic float-operated valves have always been subject to numerous functional difficulties, particularly where heat is applied to the tank. Principal among the difficulties arising from heating the liquid is the lining of incrustation by minerals resulting from evaporation, as for example, when water is the liquid. Calcium carbonate and the like, normally carried in solution by water, is precipitated upon heating and attendant evaporation of the water. The precipitated mineral deposits build up rapidly and restrict the operation of the valves by the incrustation of mechanical linkages and partial or total restriction of the valve outlet, seats, stems, and other functional parts. The float also becomes incrusted and may be unbalanced to complete inoperativeness. The reduction of the freedom of the linkage and the unbalancing of the float by incrustation with minerals, will cause the valve to become increasingly unresponsive. The electrodes in the constant level-maintaining devices are subject to substantially the same difficulty, that is, liming. The electrodes themselves are incrusted with the minerals and are therefore subjected to varying resistances which subsequently restrict flow of current or unbalance the control bridges set up in the control circuit. When this occurs, current which would normally flow when the electrode is immersed does not flow and, depending on the circuit, i. e., the valve-current system, the reservoir either becomes dry or overflows causing unnecessary delay and damage to associated apparatus. Both of these popularly known controls are deficient in that they do not provide smooth throttling from full to incremental flow as the desired level is approached.

Many other methods have been used to maintain a constant liquid level in a tank, one of the most common and cheapest methods is the constant trickle or flow method. This method is of course subject to the serious objection that if the evaporation or the withdrawal is not at a constant rate, the inflow to the tank is either in excess of the demand or is insufficient to maintain the level. Further, incrustation of needle valves used to regulate the rate of flow presents a problem and requires constant attention and adjustment to maintain even the predetermined rate. When, as is the normal practice, the inlet is above the normal liquid level the inlet becomes restricted by incrustation and will eventually close completely cutting off the flow of liquid to the reservoir.

Therefore, a primary object of the present invention is to provide an automatic liquid level control device which is substantially free from incrustation, liming, and the like.

Another object is to provide an automatic liquid-level control device which is simple to fabricate, has few parts, all of which are simple in operation, and which requires little or no maintenance.

Another object of the present invention is to provide a liquid-level control device which can be used to maintain a level of a liquid in an open-faced reservoir such as an evaporator tray of a humidifier.

Another object of the present invention is to provide a hydro-static-responsive liquid-level control device which is operative under conditions of extreme corrosive fluids.

Another object of the present invention is to provide a hydro-static-responsive liquid-level control device which will always maintain the inlet to the controlled container under a liquid and thus materially reduce liming or incrustation caused by evaporation at the inlet to the controlled container and thus accomplishes smooth throttling in response to pressure variations.

A further object of the present invention is to provide an automatic liquid-level control device which is sensitive to the hydrostatic pressure or level in a remote container while employing a unique valving arrangement providing an incrementally throttled flow control through the use of the differential pressures.

A still further object of the present invention is to provide a simple hydrostatic responsive element which does not require bleeding of trapped air from the water side and which is capable of extreme production economies and long trouble-free life.

These and other objects and advantages of the invention will become apparent to those skilled in the art as they are more fully set forth in the detailed disclosure with reference to the accompanying drawings.

In the drawings:

Figure 1 is a sectional elevation view showing the valve, chambers and diaphragm of the liquid level control device of the present invention.

Figure 2 is a sectional elevation view showing a modified valve with strainer, a modified diaphragm and case of the liquid level control device of the present invention.

Figure 3 is a top plan view of the liquid-level control device of the present invention.

Figure 4 is a side elevation view of a liquid-level control device of the present invention and shows the associated tubing to the humidifier pan and illustrates a variant position of tubing to feed a humidifier pan plate as shown in phantom line.

Figure 5 is a cross section view of a humidifier pan taken on line V—V of Figure 4.

Figure 6 is an elevation view of a humidifier plate for top feed in accord with the present invention.

Figure 7 is a side elevation view of the humidifier pan of the present invention without the humidifier plate.

Figure 8 is an end view in elevation of the humidifier pan of the present invention without the humidifier plate.

Figure 9 is a perspective view of a flat-type humidifier pan with evaporator plates in association with a modified liquid-level control device in accord with the present invention.

Figure 10 is a schematic elevational sectional view of a valve in accord with the present invention and illustrating the simplicity of the valve and its actuation.

*General description*

The present invention, a constant liquid-level control device, comprises a hydrostatic-pressure actuated control unit having fluid-flow control means, actuated by a hydrostatic-pressure sensitive element within said unit and which unit can be remotely positioned with respect to a fluid reservoir interconnected in operative fluid-flow relation with the said device. The flow-control means comprises a novel valve associated to be responsive to variations of hydrostatic-pressure acting through and on the hydrostatic pressure-sensitive element. The flow control means is positioned on or near the housing for the hydrostatic-pressure sensing element and has, associated therewith, means to operatively follow the movement of the hydrostatic pressure-sensitive element in response to changes in hydrostatic pressures within the hydrostatic pressure-responsive element in response to like changes in a reservoir. The pressure sensing element moves to cause a delicate opening and closing of the valve so as to accomplish smooth throttling of fluid flow in the system.

The hydrostatic-pressure responsive unit of the present invention comprises a housing, having joined mating upper and lower shells. The upper shell has an opening therein for insertion of an entry tube therethrough and a second opening therein for insertion of a flow-control follower means therethrough. The lower shell has an outlet communicating the chamber formed by this member with a reservoir. Secured between the two shells is a flexible pressure-sensitive element which forms with the mating shells two chambers therein. The entry tube is located to extend vertically upward above the upper shell and communicates the lower chamber formed by the lower shell and the pressure-sensitive element with the atmosphere above the upper shell. Mounted operatively above the pressure-sensitive element and in abutting position thereto is a presser plate element. The presser plate multiplies and positively directs the movement of the pressure-sensitive element to the flow-control follower, thus actuating the valve in the flow-control means in response to the hydrostatic pressure applied to the pressure-sensitive element.

The flow-control means comprises a valve body having an inlet and an outlet orifice. The inlet orifice forms an internal boss. A flexible diaphragm is positioned to engage said boss in response to movement of the flow-control follower as it moves with the multiplier presser plate and the pressure-sensitive element in response to hydrostatic pressures within the lower chamber of the hydrostatic-pressure control device.

A reservoir, in a position remote from the control device, is connected to the lower chamber of the hydrostatic element by a conduit which allows the hydrostatic element to be positioned remote from the reservoir at the desired reservoir water level. Thus, a control device has been provided which is remote from the reservoir and which will not be subject to the numerous disadvantages of prior-known liquid-level and humidifier controls such as liming caused by heating when the control element is positioned within the reservoir. The reservoir is supplied with relatively porous surface area increasing elements to enhance evaporation. The desired liquid-level in the reservoir is thus maintained since any unbalance in the level is sensed and transmitted to the valve actuating membrane to open and close flow to the reservoir. These elements will be more particularly appreciated as the description proceeds.

*Specific description*

Referring with more particularity to the drawings, the liquid-level control device of the present invention shown in the accompanying drawings comprises a hydrostatic pressure-sensitive unit or housing 11 which housing 11 has an upper shell 12 and a lower mating shell 13 peripherally joined to form the housing 11 with a hollow interior. The upper shell 11 has located therein a first opening 14 for receipt therethrough of an entry tube 15 and a second opening 16 for receipt of a flow-control follower 17. Said latter opening 16 is preferably near the periphery of the said upper shell 12. Within the housing 11 and positioned between the upper shell 12 and lower shell 13 is a flexible hydrostatic pressure-sensitive diaphragm 18 peripherally secured between the rims 19 and 20 of the housing shells 12 and 13, respectively, and separating the hollow interior of the shells and forming therein an upper chamber 21 and a lower chamber 22, respectively. The diaphragm 18 has located therein a seat 23 for peripheral sealing attachment to the lower end 24 of the entry tube 15. The entry tube 15 extends upwardly through the upper shell 12 through the opening 14, thus communicating the lower chamber 22 through the tube 15 with the atmosphere. The entry tube 15 is sealed securely to the diaphragm 18 for movement therewith. In the chamber 21, and in intimate abutting surface contact with the diaphragm 18, is a hinged multiplier or presser plate 25. The presser plate 25 is hinged at a peripheral edge of the upper shell 12 and is preferably hinged at the peripheral edge of shell 12 adjacent opening 16. The multiplier plate 25 is preferably the same shape as the diaphragm 18. An opening 26 is provided in the multiplier plate 25. The opening 26 accommodates the entry tube 15 and the plate 25 is adhesively attached to the diaphragm 18 annularly of the entry tube connection 23.

Associated with the upper shell 12 of the housing 11 near the edge of the upper shell 12 is a flow-control valve 27. The flow-control valve 27 has a follower pin 17, extending through a guide bushing 28. The bushing 28 is affixed within the hole 16 of the upper shell 12 permitting extension of the pin 17 into operative following contact with the hinged multiplier or presser plate 25. Thus, the follower 17 is acted upon by the movement of the presser plate 25 which is motivated in response to movement of the diaphragm 18 as hydrostatic-pressure changes occur within chamber 22. The valve 27 is provided with a fluid inlet orifice 29 communicating with a centrally located chamber 30 within the body 31 of said flow-control valve 27. The inlet orifice 29 forms a boss 32 positioned above the follower 17. Separating the follower 17 from the boss 32 is a flexible impervious membrane 33 positioned in operative closing position with the inlet orifice 29. The membrane 33 thus separates the valve chamber 30 from the upper atmospheric pressure chamber 21. Pressure upon the membrane 33 closes or opens the inlet 29 upon membrane 33 contacting or removing from the boss 32. The centrally located valve chamber 30 communicates with the exterior of the flow control-element 27 through an outlet orifice 34 and a delivery tube 35 which transfer fluid from the central valve chamber 29 to a position above the entry tube 15. The delivery tube 35 is spaced above the entry tube 15 of the hydrostatic element housing 11 so as not to interfere with the vertical movement of the entry tube 15 in response to its motion resulting from movement of the diaphragm 18 and hinge plate 25. The lower shell 13 of the hydrostatic element housing 11 is provided with a discharge opening 36 in its bottom which serves to communicate the lower chamber 22 through a conduit 37 with a reservoir 38 mounted within a plenum chamber of a heating area, for example. (See Figure 4.)

The reservoir 38 can be of any size suitable (Figures 4, 5, 7, 8 and 9) for use in evaporating. Since evaporation is controlled by quantity of heat, air velocity and exposed area, the shape of the reservoir 38 will vary to suit specific installations. One modification uses a shallow pan (Figure 9) which is placed as close to the heating element as possible and has a large surface area of exposed water. This is the simplest form of evaporation.

Another modification of evaporation pan or reservoir 38 is a long narrow relatively deep trough (Figures 4, 5, 7 and 8). This trough or pan 38 can be used under restricted space limitations where there is insufficient room to mount the shallow flat pan (Figure 9). Since there is little exposed water-surface area evaporation the narrow type reservoir 38 is limited in use. To increase evaporation in either type reservoir 38, a pad or plate 39 of a material that will readily wet and absorb water is inserted into the reservoir 38 edgewise so that a portion of the pad 39 is submerged in water. The unsubmerged portion of the pad 39 is wetted by wick action (Figure 9). Heat and air flow by the wetted pad 39 and evaporate water therefrom. The pad 39 is continuously being re-wetted by the wick action. The area of pad 39 exposed to air passage is limited by the height to which the water will creep by capillary action. To insure a thoroughly wetted pad 39, a top feed system 40 has been provided as shown in phantom line in Figure 4. The pad 39 in the top feed system 40 is provided with a source of water at the upper edge 41 of the plate 39 (Figure 6). The discharge tube 35 of the flow-control valve 27 is extended to provide a source of water to tube 42 which is split to secure the upper edge 41 of the pad 39. The water seeps through the split tube 42 and gravity wets the surface of pad 39. This system 40 permits a larger effective pad area and assures a constantly wetted surface. Hydrostatic-pressure element 11 operates in the same manner as hereinbefore described except no water is discharged into the entry tube 15 but the diaphragm 18 receives hydrostatic-pressure through association with the reservoir 38 and tube or conduit 37. The pressure sensing system regulates the level of water in the reservoir 38 just as before. Thus, as the water is evaporated from the pad 39 the re-wetting of the pad 39 by capillary or wick action from the reservoir 38 depletes the water in the reservoir 38 and reduces the hydrostatic-pressures on the diaphragm 18 which allows the flow control valve 27 to open. Water will flow through the delivery tube 35 to the pad top feed tube 42. Water then trickles down, over the pad 39 and if not evaporated before reaching the reservoir 38 will refill the reservoir 38. Thus, we are able to keep the pad 39 wetted over a much larger surface area.

Figure 9 shows a modified version of humidifier pads 39 providing a large wetted surface exposed to the hot air in a plenum of a heating unit (hot air furnaces for example). The flat type pan 38 is provided with absorption plates 39 a portion submerged and a portion projecting into an air stream. The plates 39 are held in upright spaced position by use of rack 43 provided with openings or slots 44 to receive and hold the submerged portion of pad 39. Hydrostatic-element 11 is operatively attached in the manner hereinbefore described. The pads 39 are preferably made from relatively porous material such as ceramic plates. Asbestos pads 39 and packed fibrous material such as cotton filler with loose binder and fiber glass mats have proved satisfactory in use.

Figures 2, 3 and 4 show an embodiment of my invention including the use of a strainer 45 mounted in line before the flow-control unit 27 of the liquid-level maintaining housing 11. The strainer 45 provides a means to remove small particles which might be carried in a liquid before they enter the valve chamber 30. This provision of the strainer 45 insures the longer operation of the valve elements which are subject to erosion, wire drawing, abrasion and clogging action of the particles of matter carried by a liquid. A screen can be placed in the inlet to the valve 27 to replace the strainer 45 shown here. Provisions are made in the valve for a screen chamber above the orifice 29 in a valve body substantially similar to those shown in Figures 1 and 2. Figure 4 illustrates an embodiment providing for the use of a substantially U-shaped tube 37 mounted between the humidifier pan 38 and the remotely located hydrostatic responsive element housing 11 to reduce the transmission of heat from liquid in the reservoir 38 to the lower chamber 22 of the hydrostatic element 11. The hydrostatic element 11 of the shape hereinbefore described may also take various other shapes which do not detract from the operative design as shown and described. For example, a control device having mating circular housings and a circular diaphragm 18 (Figures 1 and 9) has proven useful in certain installations. The multiplier or hinged presser plate 25 is then also of circular design. Thus, the entry tube 15 is shown mounted in the substantial enter of the diaphragm 18, and the diaphragm 18 is substantially an annulus. The modification shown in Figure 2 is to accommodate a filter or strainer 45 integral with the valve 27.

It is apparent from the foregoing description and from the drawings that various other modifications can be made in my liquid level maintaining device without departing from the scope of the present invention. For example, the diaphragm 18 and the hinge plate 25, may, in certain embodiments, be constructed such that no hinging is necessary. That is to say, that the diaphragm 18 being peripherally secured between the upper and the lower housings 12 and 13, respectively, may have securely mounted above it and integral with it a stiffener plate 25 covering substantially the entire surface area of the diaphragm 18, thus eliminating the necessity for hinging the plate 25. However, multiplication of the movement of the diaphragm 18 is not as great with this modification as when the plate 25 is hinged.

The entry tube 15 may be formed integral with diaphragm 18 and such modification is intended to be within the scope of the present invention. Also the position of the fulcrum of the multiplier plate 25 can be varied depending on the mechanical advantage desired.

The follower pin 17 may be a linkage to allow the valve to be remote from the element 11. The principal requirement is that movement of some portion of the presser plate 25 in the element 11 and in the valve 27 assures the operation of the membrane 33 against and away from the orifice boss 32.

The strainer element 45 includes a sediment bulb where feed water conditions necessitate its inclusion (Figure 2). In many instances a mere screen interposed in the flow line is satisfactory. It has been proved in use that if the valve body 31 is made from nylon instead of brass or other metal, the life of the valve 27 is considerably extended. Scoring of the boss is substantially avoided. Where a brass or metal valve body 31 is used a Monel insert in the inlet 29 to form a boss 32 has proved desirable and resists corrosive action.

*Operation*

In the operating of the present invention, the installation is made as follows: a source of fluid supply to, for instance, a humidifier pan is broken and the liquid level device 11 is installed in the following manner and with the resulting operation: the supply line is broken at a position remote from the reservoir 38 of, for example, a humidifier reservoir 38, which reservoir 38 is normally located within the jacket or plenum of a heating unit of a hot air furnace, for example. In a preferred embodiment of the invention above described the control device 11 consists of a strainer element 45 (sediment bulb and screen) a flow control valve 27 and sensing elements 18, 25, and 17. The flow of fluid from the source is directed to the strainer element inlet 46 as is shown in Figures 2, 3 and 4. The water or other liquid will then pass through the strainer 45 and out of the strainer 45 through inlet orifice 29 of the flow control means 27 such as is shown in Figures 1 and 2 and as hereinbefore described. The flow control membrane 33 being normally in an open position, the water will flow into and through the inlet 29 to the chamber 30 and out of the chamber 30 through outlet orifice 34 and delivery tube 35. The delivery tube 35 in turn communicates the source of supply with the entry tube 15 of the hydrostatic element 11 or top feed system 40 (Figure 4). The fluid, for example, water, is first admitted in full-flow manner into the entry tube 15 and thus to the lower chamber 22 of the hydrostatic element 11. The flow is then into the reservoir or humidifying pan 33 through the conduit 37. The entry tube 15 of the hydrostatic pressure responsive element 11 is positioned with its top above any desired water level established in the humidifier pan 38. The upper chamber 21, open to the atmosphere by reason of the annulus 14 of the upper shell 12, allows the hydrostatic pressure exerted by the water in the lower chamber 22 and the entry tube 15 to move diaphragm 18 and associated plate 25 and follower 17. As the water in the pan 38 nears the desired level, the water in the hydrostatic pressure responsive element 11 rises accordingly and into entry tube 15. This being true, a pressure will be exerted upwardly against the diaphragm 18 as the water rises in tube 15. The water trapped within the lower chamber 22 attempts to reach the same level as that in the reservoir 38 and the entire force of this hydrostatic pressure bears against the diaphragm 18. This pressure results in upward movement of the diaphragm 18 which in turn is transmitted to the hinged multiplier or presser plate 25, is multiplied thereby, and such multiplied movement exerted to move the follower 17. The follower 17 moves upwardly against the membrane 33 forcing the membrane 33 into restricting contact with inlet boss 32 and throttling the flow of liquid to chamber 22. This will smoothly and quickly reduce the flow of fluid to the hydrostatic element 11 and to the humidifier reservoir 38. When the liquid exerts the full pressure, that is when the desired level of the liquid in the reservoir 38 is reached, the membrane 33 will bear against inlet boss 32 and completely close the inlet so that no water will flow until the level in the reservoir 38 has dropped releasing the pressure against the diaphragm 18 and simultaneously opening the inlet 29 by movement of the membrane 33 away from the inlet boss 32.

In this manner a chamber, container, or reservoir can be supplied with a constant level of fluid. The elements are simple and respond to incremental changes almost simultaneously. Since the entire system is open to the atmosphere, no bleeding of the lower chamber is required. This is one of the additional advantages of the present system.

The principles of valve operation are best illustrated schematically in the novel valve 27 shown in Figure 10. The flexible diaphragm 18 is moved by the differential pressure applied on either side. On one side the pressure is atmospheric. A hinged presser plate 25 responds and magnifies the action of the diaphragm 18 to act upon the flexible membrane 33 urging the membrane 33 to either obstruct or uncover the inlet 29. The effect of this novel valving arrangement permits smoothly responsive metering of fluid flow in response to minute unbalance in level, for example.

It is not the intent to limit the application to humidifiers and therefore it is to be understood that any constant level liquid container may be controlled by our liquid level control device.

We claim:

1. In a liquid level maintaining device the elements including: an upper housing, a lower mating housing; said upper housing having openings therein to receive cooperating elements therethrough; said lower housing having associated therewith an exit tube; a flexible diaphragm intermediate said housings and forming with said housings an upper and lower chamber; an entry tube attached to said diaphragm communicating the said lower chamber with the atmosphere; a normally open valve means associated with said upper housing having actuating means through said housing in energizable contact with said diaphragm to respond to the movement of said diaphragm in response to changes in hydrostatic pressure; a fluid delivery tube between said valve and said entry tube emptying into said entry tube in spaced relation thereabove; and a supply of fluid to said valve.

2. In a liquid level maintaining device the elements including: an upper housing; a lower mating housing; said lower housing having a fluid exit associated therewith; a flexible diaphragm intermediate and separating said housing into an upper and lower chamber secured peripherally between said housing; an annular plate contacting substantially the upper working area of said diaphragm; an entry tube attached centrally to said diaphragm and said plate extending upwardly through said upper housing communicating said lower chamber with the atmosphere; normally open valve means associated with said upper housing having actuating means through said upper housing in energizable contact with said diaphragm and said plate to respond to the movement of said diaphragm and said plate in response to changes in hydrostatic pressures; a delivery tube from said valve emptying into said entry tube and in spaced relation thereabove; and a fluid supply attached to said valve.

3. In a liquid level maintaining device the combination including an upper housing; a lower mating housing; a flexible diaphragm intermediate said housing, separating said housings to form an upper and lower chamber thereof and secured peripherally therebetween; an annular plate contacting substantially the upper working area of said diaphragm and being hinged in said upper housing; an entry tube attached centrally to said diaphragm extending upwardly through said plate and extending through said upper housing and communicating the external atmosphere with the chamber formed by the said lower housing and said diaphragm; a normally open valve means associated through said upper housing actuating means energized by the movement of said diaphragm in response to hydrostatic pressure; a delivery tube connected to the outlet of said valve and emptying into said entry tube in spaced relation thereabove; a connecting tube attached to said valve and comprising a fluid entry thereto; a strainer element having a filter and a sediment bulb connected to said connecting tube in filtering cooperation therebefore and having a fluid entry thereto.

4. In a liquid level maintaining device for humidity control the combination including: an upper housing; a lower mating housing; an outlet from said lower housing; a flexible diaphragm intermediate said housing and forming with said housings an upper and lower chamber; an entry tube attached centrally to said diaphragm communicating the said lower chamber with the external atmosphere; a normally open valve means associated with said upper housing having actuating means through said housing actuated by the movement of said diaphragm in response to hydrostatic pressure; a delivery tube connected to the outlet of said valve and emptying into said entry tube in spaced relation thereabove; and a connecting tube attached to said valve and comprising a fluid entry thereto; an open-faced fluid container; an outlet tube connecting said lower housing outlet with said container for delivery of fluid thereto in response to changes in liquid level therein.

5. A device as recited in claim 4 wherein said valve actuating means comprises: a flexible membrane; a sensing plunger in contact with said membrane on one side; and a pressure plate hinged to said housing and in movable contact with said membrane and moving said plunger in response to variations in differential pressure on said diaphragm.

6. A valve opened and closed by minute pressure changes including: a valve body including an inlet orifice and an outlet orifice, one of said orifices forming an internal boss; a flexible membrane closing one side of the valve body and positioned to engage said boss; a pressure plate hinged to pivot and having a raised portion bearing upon the outside of said flexible membrane; and a flexible actuation diaphragm bearing upon said presser plate and moving said presser plate in response to the differential pressure on either side of said actuation diaphragm to open or close flow between said outlet and inlet orifices in said valve body.

References Cited in the file of this patent
UNITED STATES PATENTS

| | | |
|---|---|---|
| 1,602,820 | Jones | Oct. 12, 1926 |
| 2,471,328 | Jones | May 24, 1949 |
| 2,565,210 | Dovolis | Aug. 21, 1951 |
| 2,573,158 | Muth et al. | Oct. 30, 1951 |